US012566497B2

(12) United States Patent
Adam et al.

(10) Patent No.: US 12,566,497 B2
(45) Date of Patent: Mar. 3, 2026

(54) GAZE TRACKING BASED NOTIFICATION TRACKING TIMER

(71) Applicant: GM Global Technology Operations LLC, Detroit, MI (US)

(72) Inventors: Paul A. Adam, Milford, MI (US); William Lawrence Kozlowski, Novi, MI (US); Alexander Gene Rath, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/659,454

(22) Filed: May 9, 2024

(65) Prior Publication Data

US 2025/0348134 A1 Nov. 13, 2025

(51) Int. Cl.
*G06F 3/01* (2006.01)
*B60K 35/22* (2024.01)
*B60K 35/65* (2024.01)

(52) U.S. Cl.
CPC .............. *G06F 3/013* (2013.01); *B60K 35/22* (2024.01); *B60K 35/654* (2024.01)

(58) Field of Classification Search
CPC ....... G06F 3/013; B60K 35/22; B60K 35/654; B60K 35/65
See application file for complete search history.

(56) References Cited

U.S. PATENT DOCUMENTS 11,975,609 B1 * 5/2024 Austin ................... B60K 35/00
2016/0196098 A1 * 7/2016 Roth ...................... G06F 3/012
715/761
2017/0364147 A1 * 12/2017 Canella .................. G06F 16/22
2023/0066670 A1 * 3/2023 Yasuda ................. G08B 21/06

* cited by examiner

*Primary Examiner* — Yuzhen Shen
(74) *Attorney, Agent, or Firm* — CANTOR COLBURN LLP

(57) ABSTRACT

A vehicle includes a display screen communicatively coupled to a vehicle controller. A gaze tracking system in the vehicle includes at least one camera defining a field of view including at least a vehicle operator's face and a tracking control module is configured to determine a gaze direction of the vehicle operator based at least in part on the field of view. The controller includes a display timing process module configured to cause a message to be displayed on the display screen while a gaze of the vehicle operator is directed at the display screen for a predetermined duration.

18 Claims, 4 Drawing Sheets

GAZE TRACKING BASED NOTIFICATION TRACKING TIMER

INTRODUCTION

The subject disclosure relates to in vehicle notification systems, and more particularly to a system and process for timing a duration of an in vehicle notification to ensure the notification has been viewed and comprehended by the vehicle operator.

Modern vehicles include numerous on-board vehicle systems configured to assist vehicle operators and/or provide information regarding the vehicle to the vehicle operator. Depending on the particular message, it can be desirable to ensure that the vehicle operator has viewed the message sufficiently long that the message is capable of being comprehended. However, depending on the driver and the complexity of the message, the length of time required for comprehension may vary. In addition, the message may be displayed in a manner that covers all or a portion of a display screen, and it may be undesirable to display the message longer than necessary.

As such, it is desirable to develop a system that ensures a notification message has been viewed by a vehicle operator for a sufficient length of time that the message has been comprehended without displaying the message for excessive lengths of time and without allowing the message to be dismissed without comprehension.

SUMMARY

In one exemplary embodiment a vehicle includes a display screen communicatively coupled to a vehicle controller. A gaze tracking system in the vehicle includes at least one camera defining a field of view including at least a vehicle operator's face and a tracking control module is configured to determine a gaze direction of the vehicle operator based at least in part on the field of view. The vehicle controller includes a display timing process module configured to cause a message to be displayed on the display screen while a gaze of the vehicle operator is directed at the display screen for a predetermined duration.

In addition to one or more of the features described herein the vehicle controller includes a memory storing instructions configured to cause the vehicle controller to perform a first notification display process, the first notification display process includes: the vehicle controller receiving a command to display a message to a vehicle operator, determining a gaze direction of the vehicle operator, continuously incrementing a duration counter while the gaze direction of the vehicle operator is oriented toward the display screen, and terminating display of the message in response to the gaze of the vehicle operator turning from the display screen subsequent to the duration counter exceeding a predetermined time.

In addition to one or more of the features described herein the predetermined time is a length of time required for the vehicle operator to comprehend the message.

In addition to one or more of the features described herein the predetermined time is a factory default length of time.

In addition to one or more of the features described herein the predetermined time is a length of time based at least in part on historical comprehension times of the message acquired during operation of a learn mode.

In addition to one or more of the features described herein the vehicle controller includes a control module configured to cause the vehicle controller to perform a comprehension time process including entering a learn mode of operation in response to receiving a learn mode command from an operator, responding to a command to display a message by displaying the message on a screen and monitoring the gaze direction of the operator and initiating a learn timer responsive to determining that the operators gaze defines a field of view including a screen on which the message is displayed, incrementing the learn timer while the operator's gaze defines a field of view including the screen, stopping the learn timer in response to both receiving an acknowledgement from the operator that the message has been comprehended and the operator's gaze defining a field of view oriented away from the screen, storing a value corresponding to the stopped learn timer in a historical gaze time database corresponding to the message, and determining a comprehension time for the message using the historical gaze time database.

In addition to one or more of the features described herein the vehicle controller includes a plurality of historical gaze time databases, with each historical gaze time database corresponding to a distinct combination of specific messages and specific operators.

In addition to one or more of the features described herein the acknowledgement from the operator is one of a manual input, a voice command, and a gesture command.

In addition to one or more of the features described herein the acknowledgment from the operator is the manual input, and wherein the manual input is one of an analog button press and a screen tap.

In addition to one or more of the features described herein the vehicle controller is configured to verify the acknowledgement originates from the vehicle operator using the gaze tracking system.

In addition to one or more of the features described herein the at least one camera defining a field of view including at least a vehicle operator's face comprises a plurality of cameras, wherein each camera in the plurality of cameras defines a partial field of view of the gaze of the vehicle operator, and wherein the vehicle controller is configured to combine the field of view of each camera in the plurality of cameras to define a complete field of view of the operator's gaze.

In another exemplary embodiment a method for timing a vehicle display notification includes receiving a command to display a message to an operator of a vehicle at a controller, determining a gaze direction of the vehicle operator using a gaze tracking system of the vehicle, determining whether the vehicle controller is in a learn mode, and responding to the vehicle not being in the learn mode by continuously incrementing a duration counter while the gaze direction of the vehicle operator is oriented toward the display screen and terminating display of the message in response to the gaze of the vehicle operator turning from the display screen subsequent to the duration counter exceeding a predetermined time.

In addition to one or more of the features described herein the predetermined time is a length of time required for the vehicle operator to comprehend the message.

In addition to one or more of the features described herein the predetermined time is a factory default length of time.

In addition to one or more of the features described herein the predetermined time is a length of time based at least in part on historical comprehension times of the message acquired during operation of a learn mode.

In addition to one or more of the features described herein, the method includes responding the vehicle being in the learn mode by: displaying the message on a screen, monitoring the gaze direction of the operator, and initiating a learn timer in response to determining that the gaze direction of the operator defines a field of view including a screen on which the message is displayed, incrementing the learn timer while the operator's gaze defines a field of view including the screen, stopping the learn timer in response to both receiving an acknowledgement from the operator that the message has been comprehended and the operator's gaze defining a field of view oriented away from the screen, storing a value corresponding to the stopped learn timer in a historical gaze time database corresponding to the message, and determining a comprehension time for the message using the historical gaze time database.

In addition to one or more of the features described herein the vehicle controller includes a plurality of historical gaze time databases, with each historical gaze time database corresponding to a distinct combination of specific messages and specific operators.

In addition to one or more of the features described herein the acknowledgement from the operator is one of a manual input, a voice command, and a gesture command.

In addition to one or more of the features described herein the acknowledgment from the operator is the manual input, and wherein the manual input is one of an analog button press and a screen tap.

In another exemplary embodiment a vehicle includes a display screen communicatively coupled to a controller. The vehicle further includes a gaze tracking system including at least one camera defining a field of view including at least a vehicle operator's face, and a tracking control module configured to determine a gaze direction of the vehicle operator based at least in part on the field of view. The vehicle controller including a display timing process module configured to cause a message to be displayed on the display screen while a gaze of the vehicle operator is directed at the display screen for a predetermined duration using a display timing process including: receiving a command to display a message to the vehicle operator of at the vehicle controller, determining the gaze direction of the vehicle operator using the gaze tracking system, determining whether the vehicle controller is in a learn mode, and responding to the vehicle not being in the learn mode by continuously incrementing a duration counter while the gaze direction of the vehicle operator is oriented toward the display screen and terminating display of the message in response to the gaze of the vehicle operator turning from the display screen subsequent to the duration counter exceeding a predetermined time.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
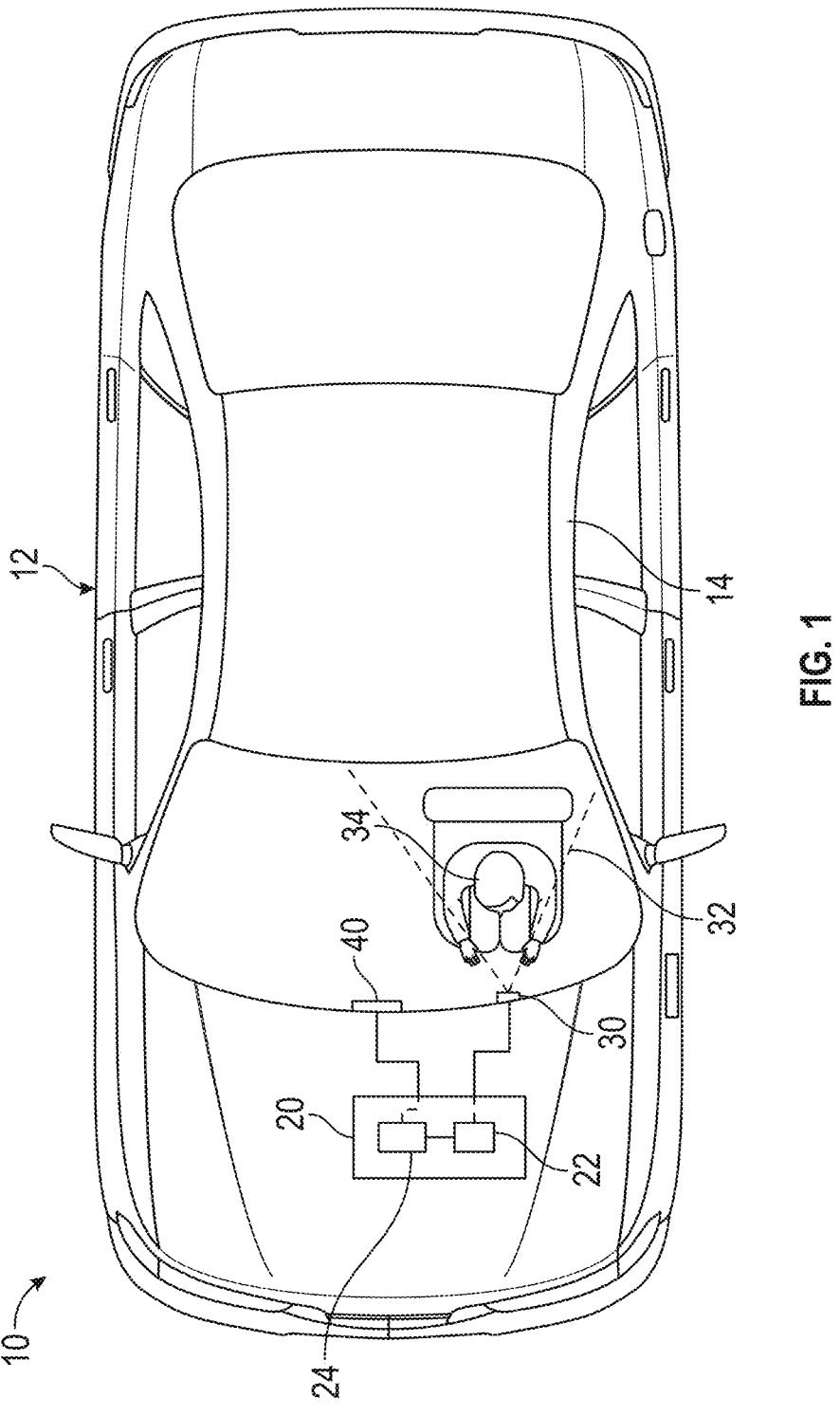
FIG. 1 is a top view of a motor vehicle including a gaze tracking system and a notification display control system.

The following description is merely exemplary in nature and is not intended to limit the present disclosure, its application or uses. It should be understood that throughout the drawings, corresponding reference numerals indicate like or corresponding parts and features.

In accordance with an exemplary embodiment methods, devices and systems are provided which utilize eye position tracking and head position tracking to determine a direction and field of view corresponding to a vehicle operator's gaze. These systems are referred to generally herein as gaze tracking systems, and can be accomplished using existing structures and systems. A vehicle controller utilizes the gaze tracking system to provide a consistent and predictable amount of display time for display messages within a vehicle.

In general operation of a controller ensures comprehension of a message or notification (referred to generally throughout as "the message") by beginning a message timer after the vehicle operator's gaze is directed to a display, with the duration of the message timer being selected to ensure that the message is displayed and within the vehicle operator's gaze for a sufficient duration of time that the vehicle operator is able to comprehend the message. After the message timer duration elapses, either the system automatically dismisses the message or allows the vehicle operator to manually dismiss the message, thereby ensuring that the vehicle operator has viewed and comprehended the message.

In another example operation, the vehicle controller can establish the duration of the timer for a specific vehicle operator and/or a specific message by beginning with an initial standard duration and tracking actual gaze durations over multiple instances of the message. A statistical analysis is applied to the database of historical actual gaze times for the specific vehicle operator and/or message to establish a single duration sufficient to ensure that the vehicle operator has viewed and comprehended the message. Once sufficient understanding of the required time for comprehension is determined (e.g., a statistically significant sample size has been collected) the vehicle controller begins automatically dismissing the message on all consecutive instances of the message after the gaze has been directed toward the message for the determined duration.

Embodiments described herein present numerous advantages and technical effects. Included among the technical effects provided by the various embodiments is an ability for a controller to reduce non-driving related vehicle operator functions by eliminating a need to manually dismiss notifications and an ability to ensure that a message has been viewed and comprehended by the vehicle operator prior to allowing the message to be dismissed.

FIG. 1 shows an embodiment of a motor vehicle 10 capable of performing the general processes. The vehicle 10 includes a vehicle body 12 defining, at least in part, an occupant compartment 14. The vehicle body 12 also supports various vehicle subsystems and other vehicle components, such as a braking subsystem, a suspension system, a steering subsystem, a fuel injection subsystem, an exhaust subsystem, driver assistance subsystems and others.

The vehicle 10 includes a controller 20. The controller 20 may be a generic vehicle controller, a dedicated system controller, a combination of interconnected vehicle controllers, or any similar vehicle control configuration. Within the controller 20 is a gaze tracking module 22 and a notification module 24. In one example each of the gaze tracking module 22 and the notification module 24 are software modules within the controller 20. In another example, each of the gaze tracking module 22 and the notification module 24 are distinct controllers included within a network of communicatively coupled controllers forming the controller 20.

The controller 20 is connected to, and in communication with, at least one camera 30. The camera 30 faces the occupant compartment 14 and defines a field of view 32 including a face 34 of a vehicle operator. The field of view 32 captures an eye position and/or head position and orientation based on the captured images of the face 34. The gaze tracking module 22 uses the images captured by the at least one camera 30 to monitor a gaze of the vehicle operator 34. The gaze 34 is tracked using any existing systems.

In some embodiments, the at least one camera 30 is representative of multiple cameras disposed about the occupant compartment 14. In such examples, a combination of the fields of view define the field of view 32 including the vehicle operator's face 34, and the controller 20 includes software modules configured to collectively analyze the fields of view provided by the multiple cameras.

The controller 20 is further connected to one or more screens 40, and the notification control module 24 is configured to cause the one or more screens 40 to display vehicle operation notifications. By way of example, the notification may include a speed limit change, an entering high alert zone (e.g. a construction zone) warning, a don't read screen 40 while driving warning (provided prior to initiation of the vehicle 10), or any similar warnings or alerts. The notifications are, in some examples, associated with specific vehicle 10 operations.

Figure 2:
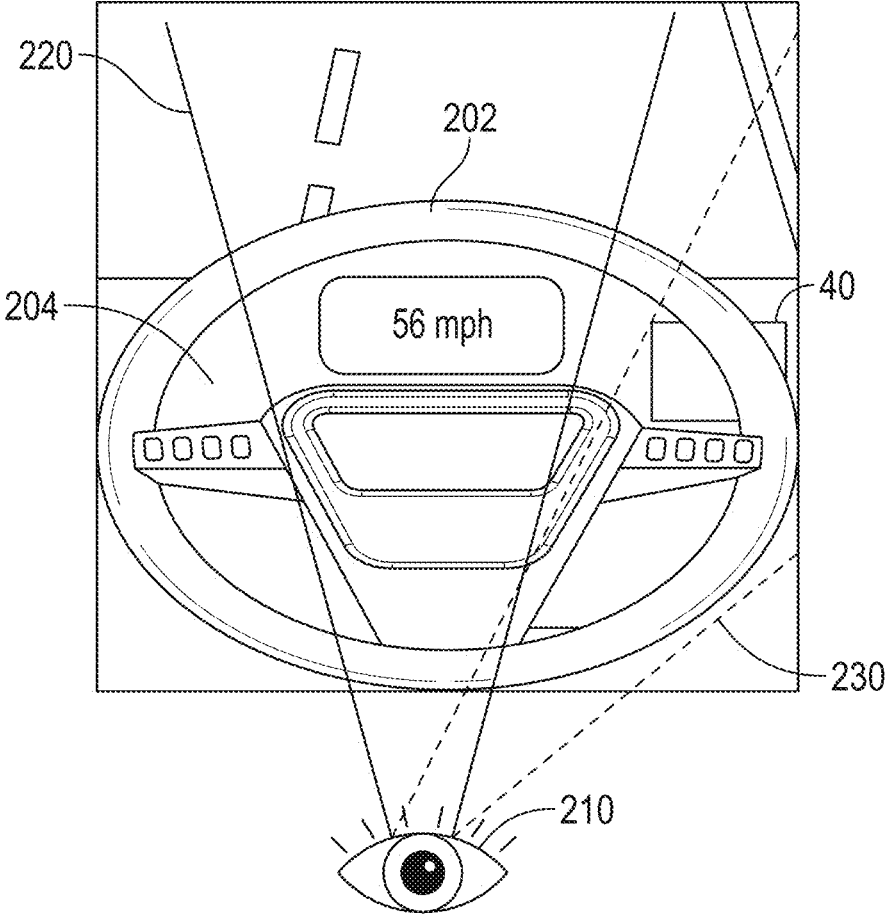
FIG. 2 depicts an exemplary vehicle operator gaze.

With continued reference to FIG. 1, FIG. 2 illustrates a partial view from a vehicle operator's eye 210. While the operator's gaze 34 is directed forward, in an attentive position, a field of view 220 of the operator includes a steering wheel 202, a portion of a vehicle console 204, but does not include the screen 40.

After a notification is pushed to the screen 40, by the notification control module 24, the operator shifts their gaze 34 and a new operator field of view 230 includes the screen 40 allowing the operator to read and comprehend the message on the screen 40. After viewing the message, the operator shifts their gaze back to the original gaze and returns to the original field of view 220.

The gaze tracking module 22 monitors and tracks the direction of the operator's gaze 34 based on movement of the operator's eyes 210 and, in some examples, the operator's head position and orientation.

In existing systems, either the message 40 is maintained for a predetermined time period regardless of the direction of the operator's gaze 34 or the message is displayed until the vehicle 10 operator manually clears the message using an input. When holding the message for a predetermined duration, there no way to ensure that the operator views the message. Similarly, when the message is cleared from the screen 40 using manual clearing, the controller 20 has no method of knowing whether the operator has actually viewed the message or whether the operator has simply cleared the message without viewing the message.

Figure 3:
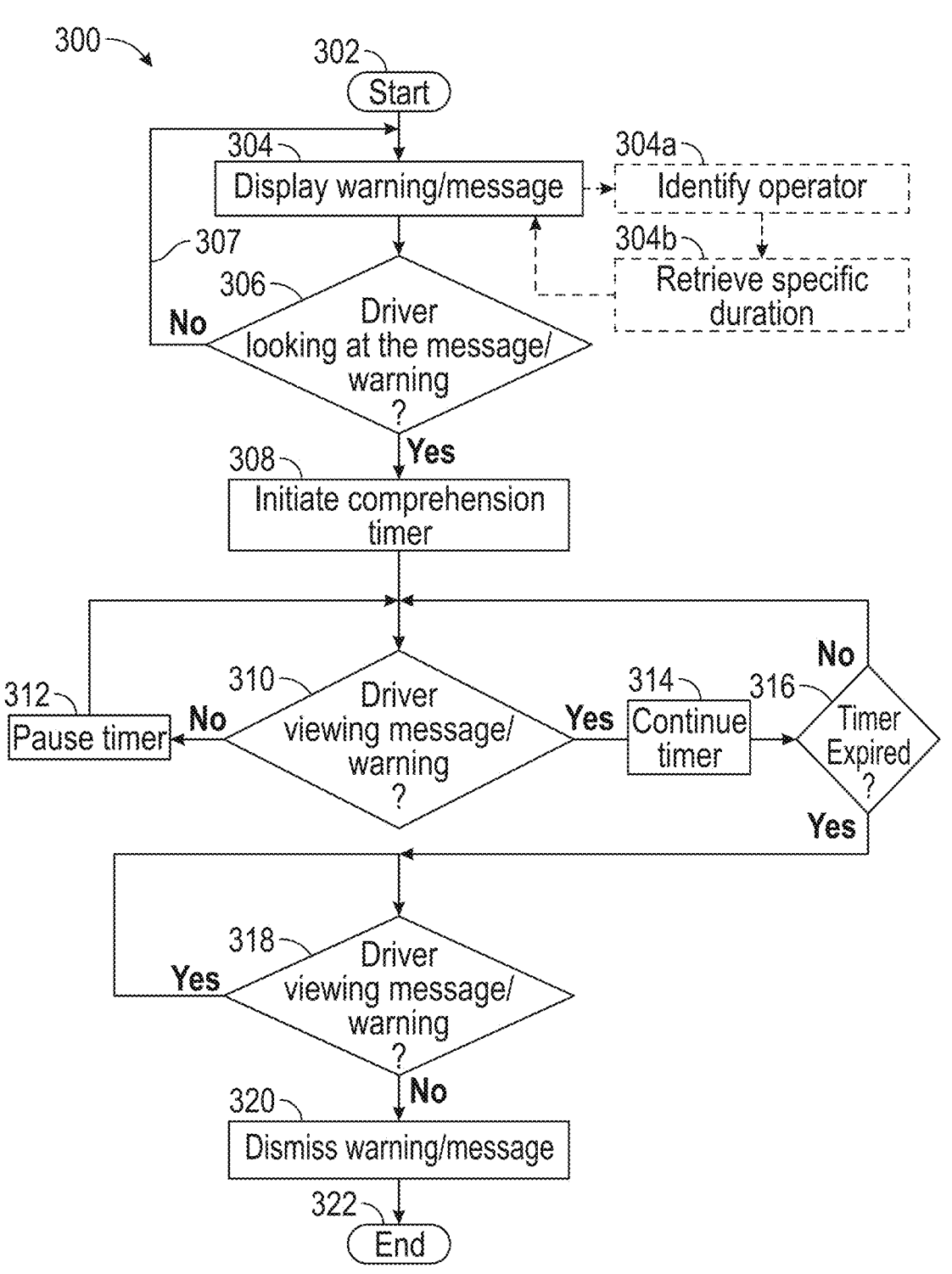
FIG. 3 depicts a process for using gaze tracking to ensure comprehension of a notification message.

In order to ensure that the operator has viewed the message for a sufficient duration that the message has been comprehended, the controller 20 of the vehicle 10 includes a process 300, illustrated at FIG. 3 which monitors the field of view 220, 230 within the operator's gaze 34 and ensures that the message is displayed on the screen 40 and within the operator's gaze 34 for the duration required for the operator to view and comprehend the message.

Initially, the notification module 24 receives a command to display a message or warning (referred to generally as "the message") from another system within the controller 20, and starts the process 300 at a Start step 302. For each specific type of message and/or each specific message, the controller 20 stores a corresponding message duration in a local memory. The message duration is an established length of time required for the operator to comprehend the message. The process 300 retrieves the corresponding duration and causes the screen 40 to display the message in a Display Warning/Message step 304.

In some examples, the message duration is a static value stored in the controller 20, or another onboard memory of the vehicle 10. In other examples, the message duration is a learned duration which can be learned for the specific vehicle 10 and/or for each specific operator of the vehicle 10. When the message duration is operator specific, the Display Warning/Message step 304 includes an Identify Operator substep 304a followed by a Retrieve Specific Duration substep 304b. The optional substeps 304a, 304b are illustrated as optional in FIG. 3 through the use of dashed lines. In some examples, the specific operator is identified at substep 304a using facial recognition through the gaze tracking control module 22. In other examples the specific vehicle 10 operator may be identified through a manual operator entry, operator weight profiles, connection with one or more operator devices (e.g., a wireless phone connection) or any other method for identifying the unique operator.

After the message is displayed on the screen 40, the controller 20 determines whether the operator is viewing the message using the gaze tracking module 24 in an Is Operator Viewing Message check 306. If the operator is not viewing the message, the process 300 return to the Display Warning/Message step 304 in a loop 307.

When the graze tracking module 24 determines that the operator is viewing the message, by determining that the screen 40 is within a field of view 220 defined by the operator's gaze, the controller 20 begins the duration timer in an Initiate Comprehension Timer step 308.

After initiating the duration timer, the process 300 checks to determine if the operator is still viewing the message in a first Driver Viewing Message check 310. When the operator has stopped viewing the message before the duration timer has expired, the duration timer is paused in a Pause Timer step 312, and the process 300 returns to checking if the operator is viewing the message at the first Driver Viewing Message/Warning check 310.

When the operator is viewing the message at the first Driver Viewing Message/Warning check 310, the process 300 continues the timer in a Continue Timer step 314 and proceeds to a Timer Expired check 316.

When the Timer Expired check 316 determines that the timer has not expired, the process 300 returns to the first Driver Viewing Message/Warning check 310.

When the Timer Expired check 316 determines that the time has expired, the process 300 proceeds to a second Driver Viewing Message/Warning check 318 and determines whether the operator is still viewing the message. While the operator is still viewing the message the second Driver Viewing Message/Warning check 318 returns yes and continues iterating and the message remains displayed on the screen 40.

When the operator's gaze 34 returns to the standard position, or otherwise stops viewing the screen 40, the second Driver Viewing Message/Warning check 318 returns no, and the process 300 dismisses the message in a Dismiss Warning/Message step 320, and the process 300 ends in an end step 322.

The sum result of the process 300 is that the message is displayed on the screen 40 until the operator has viewed the message for at least the length of the duration timer and the operator subsequently reverts their gaze 34 away from the message.

Figure 4:
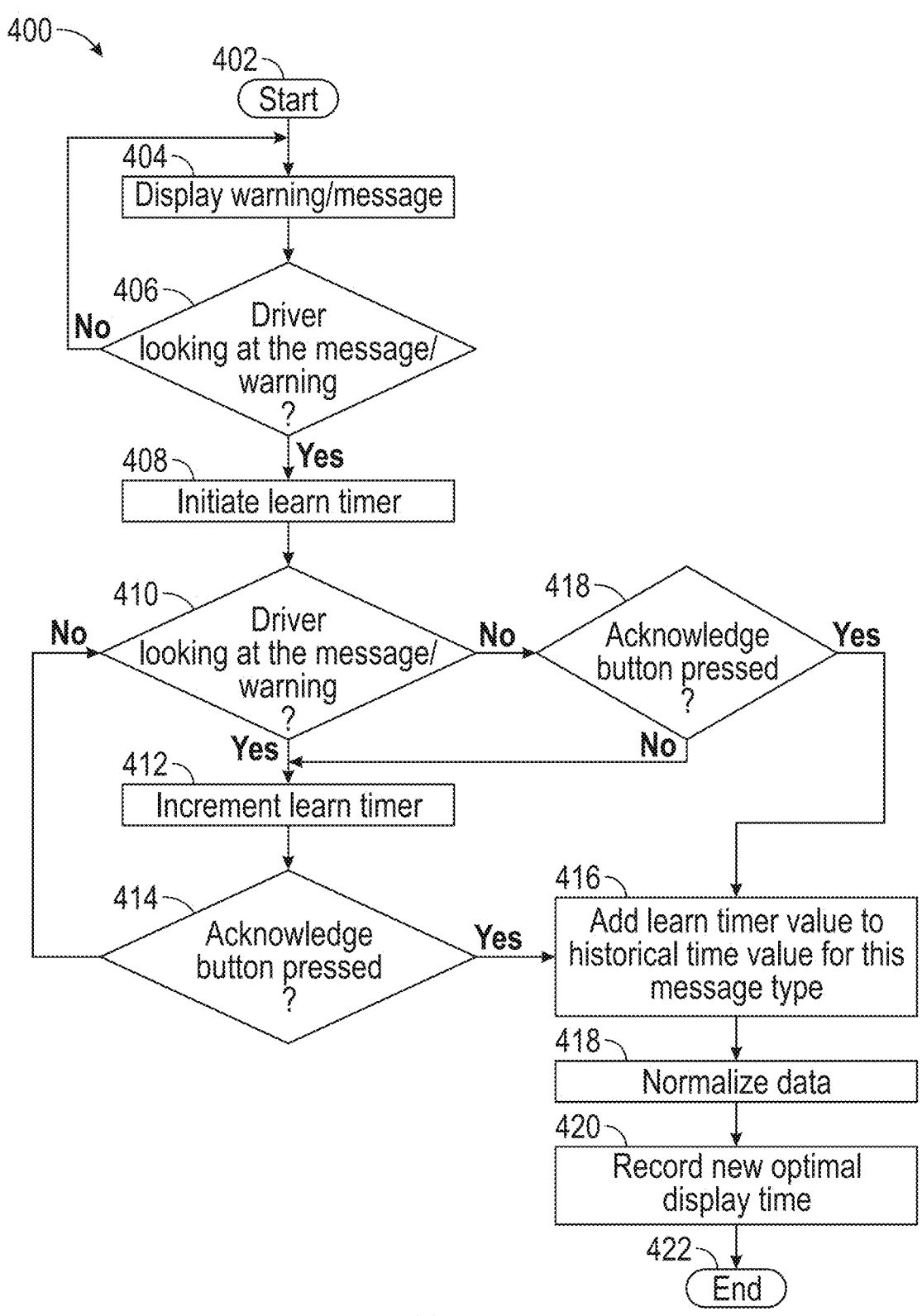
FIG. 4 depicts a process for learning a display duration to ensure comprehension of a notification message.

In some examples, the controller 20 is configured to tailor the timer for at least some of the messages to a specific operator and/or vehicle 10. To do so, the controller 20 includes a learn mode of operations. With reference again to FIGS. 1 and 2, when the vehicle 10 is new, or when the operator of the vehicle 10 manually places the vehicle 10 in the learn mode, the process 300 is replaced with a duration learning process (process 400), illustrated in FIG. 4.

While operating in a learning mode, the controller 20 responds to a request to display a message on the screen 40 by initiating the process 400 at a Start step 402. Upon initiation, the message is displayed on the screen 40 in a Display Message step 404, and the process 400 determines if the operator's gaze 34 is viewing the screen 40 in a first Driver Looking at the Message/Warning check 406.

When the operator is not looking at the screen 40, the process 40 returns to the display Warning/Message step 404 and continues to display the message on the screen 40.

When the operator's gaze 34 shifts to a position that includes a view of the screen 40, the process 400 begins a learning timer at an Initiate Learn Timer step 408. The learn timer is an indefinite upwards counting timer that continues tracking an amount of time since the operator began viewing the screen 40.

After initiating the learn timer, the process 400 performs a second Driver Looking at Message/Warning check 410. When the operator is still viewing the screen 40, the learn timer is incremented in an Increment Learn Timer step 412 and the process 400 proceeds to a first Acknowledge Button Pressed check 414.

At the first Acknowledge Button Pressed check 414, the controller 20 determines whether the operator has manually acknowledged having seen and comprehended the message. The acknowledgment is, in one example, a button press on an interface within the vehicle 10. In other examples, the acknowledgment can take the form of a voice acknowledgement interpreted by a voice recognition system within the controller 20, a hand gesture, a facial gesture, or any other form of affirmative acknowledgment generated by the operator of the vehicle 10 and interpretable by the controller 20. In some examples, the controller 20 includes one or more systems configured to ensure that the acknowledgment originates from the operator of the vehicle 10, and not from a passenger.

If the operator of the vehicle 10 has acknowledged that the screen 40 has been viewed and the message has been comprehended, the first Acknowledge Button Press check 414 stores the incremented learn timer in an Add Learn Timer to Historical Value for this Message step 416.

If the operator has not acknowledged that the message has been viewed and comprehended at the first Acknowledge Button Pressed step 414, the process 400 returns to the second Driver Looking at the Message/Warning check 410.

If, at the second Driver Looking at the Message/Warning check 410 the gaze detection control module 22 determines that the operator of the vehicle 10 is no longer viewing the screen 40, the process 400 proceeds to a second Acknowledge Button Pressed check 418. If, at the second Acknowledge Button Pressed check 418, the operator has not acknowledged having viewed and comprehended the message, the process 400 proceeds to the Increment Learn Timer step 412.

If, at the second Acknowledge Button Pressed check 418, the operator has acknowledged having viewed and comprehended the message, the process 400 proceeds to the Add Learn Timer to Historical Value for this Message Type step 416, where the final Learn Timer value is added to a historical database of Learn Timers for that specific message or message type.

After the value is added to the database of historical values, the historical times from the learn timers are normalized in a Normalize Data step 418, and the normalized data is analyzed to determine a new optimal display time using any known statistical analysis technique. The determined display time is stored in a Record New Optimal Display Time step 420, and the process terminates at an end step 422.

The result of repeated instances of the process 400 over time is the determination of a duration timer corresponding to a given message, with the duration timer being tailored to a specific vehicle 10 and/or operator.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:
1. A vehicle comprising:
a display screen communicatively coupled to a vehicle controller;
a gaze tracking system including at least one camera defining a field of view including at least a vehicle operator's face, and a tracking control module configured to determine a gaze direction of a vehicle operator based at least in part on the field of view; and
the vehicle controller including a display timing process module configured to cause a message to be displayed on the display screen while a gaze of the vehicle operator is directed at the display screen for a predetermined duration the vehicle controller further including a memory storing instructions configured to cause the vehicle controller to perform a first notification display process, the first notification display process comprising:

the vehicle controller receiving a command to display a message to a vehicle operator;

determining a gaze direction of the vehicle operator;

continuously incrementing a duration counter while the gaze direction of the vehicle operator is oriented toward the display screen; and terminating display of the message in response to the gaze of the vehicle operator turning from the display screen subsequent to the duration counter exceeding a predetermined time, wherein the predetermined time is a length of time based at least in part on historical comprehension times of the message acquired during operation of a learn mode, and wherein the historical comprehension times are determined at least in part using a historical gaze time database;

wherein the vehicle controller includes a control module configured to cause the vehicle controller to perform a comprehension time process comprising:

entering a learn mode of operation in response to receiving a learn mode command from the vehicle operator;

responding to a command to display a message by displaying the message on a screen and monitoring the gaze direction of the vehicle operator and initiating a learn timer responsive to determining that the operators gaze defines a field of view including a screen on which the message is displayed;

incrementing the learn timer while the operator's gaze defines a field of view including the screen;

stopping the learn timer in response to both receiving an acknowledgement from the vehicle operator that the message has been comprehended and the vehicle operator's gaze defining a field of view oriented away from the screen;

storing a value corresponding to the stopped learn timer in the historical gaze time database corresponding to the message; and determining a comprehension time for the message using the historical gaze time database.

2. The vehicle of claim 1, wherein the predetermined time is a length of time required for the vehicle operator to comprehend the message.

3. The vehicle of claim 2, wherein the predetermined time is a factory default length of time.

4. The vehicle of claim 1, wherein the vehicle controller includes a plurality of historical gaze time databases, with each historical gaze time database corresponding to a distinct combination of specific messages and specific operators.

5. The vehicle of claim 1, wherein the acknowledgement from the vehicle operator is one of a manual input, a voice command, and a gesture command.

6. The vehicle of claim 5, wherein the acknowledgment from the operator is the manual input, and wherein the manual input is one of an analog button press and a screen tap.

7. The vehicle of claim 1, wherein the vehicle controller is configured to verify the acknowledgement originates from the vehicle operator using the gaze tracking system.

8. The vehicle of claim 1, wherein the at least one camera defining a field of view including at least a vehicle operator's face comprises a plurality of cameras, wherein each camera in the plurality of cameras defines a partial field of view of the gaze of the vehicle operator, and wherein the vehicle controller is configured to combine the field of view of each camera in the plurality of cameras to define a complete field of view of the vehicle operator's gaze.

9. A method for timing a vehicle display notification comprising:

receiving a command to display a message to an operator of a vehicle at a controller;

determining a gaze direction of the vehicle operator using a gaze tracking system of the vehicle;

determining whether the controller is in a learn mode; and responding to the vehicle not being in the learn mode by continuously incrementing a duration counter while the gaze direction of the vehicle operator is oriented toward a display screen and terminating display of the message in response to the gaze of the vehicle operator turning from the display screen subsequent to the duration counter exceeding a predetermined time wherein the predetermined time is a length of time required for the vehicle operator to comprehend the message and the length of time is based at least in part on historical comprehension times of the message acquired during operation of a learn mode; and responding the vehicle being in the learn mode by:

displaying the message on a screen, monitoring the gaze direction of the operator, and initiating a learn timer in response to determining that the gaze direction of the vehicle operator defines a field of view including a screen on which the message is displayed;

incrementing the learn timer while the vehicle operator's gaze defines a field of view including the screen;

stopping the learn timer in response to both receiving an acknowledgement from the operator that the message has been comprehended and the operator's gaze defining a field of view oriented away from the screen;

storing a value corresponding to the stopped learn timer in a historical gaze time database corresponding to the message; and determining a comprehension time for the message using the historical gaze time database.

10. The method of claim 9, wherein the predetermined time is a factory default length of time.

11. The method of claim 9, wherein the controller includes a plurality of historical gaze time databases, with each historical gaze time database corresponding to a distinct combination of specific messages and specific operators.

12. The method of claim 9, wherein the acknowledgement from the operator is one of a manual input, a voice command, and a gesture command.

13. The method of claim 12, wherein the acknowledgment from the operator is the manual input, and wherein the manual input is one of an analog button press and a screen tap.

14. A vehicle comprising:

a display screen communicatively coupled to a vehicle controller;

a gaze tracking system including at least one camera defining a field of view including at least a vehicle operator's face, and a tracking control module configured to determine a gaze direction of a vehicle operator based at least in part on the field of view;

the vehicle controller including a display timing process module configured to cause a message to be displayed on the display screen while a gaze of the vehicle operator is directed at the display screen for a predetermined duration;

the vehicle includes a memory storing instructions configured to cause the vehicle controller to perform a first notification display process, and wherein the vehicle controller includes a control module configured to cause the vehicle controller to perform a comprehension time process comprising:

entering a learn mode of operation in response to receiving a learn mode command from the vehicle operator;

responding to a command to display a message by displaying the message on a screen and monitoring the gaze direction of the vehicle operator and initiating a learn timer responsive to determining that the operators gaze defines a field of view including a screen on which the message is displayed;

incrementing the learn timer while the operator's gaze defines a field of view including the screen;

stopping the learn timer in response to both receiving an acknowledgement from the vehicle operator that the message has been comprehended and the vehicle operator's gaze defining a field of view oriented away from the screen;

storing a value corresponding to the stopped learn timer in a historical gaze time database corresponding to the message; and determining a comprehension time for the message using the historical gaze time database.

15. The vehicle of claim 14, wherein the vehicle controller includes a plurality of historical gaze time databases, with each historical gaze time database corresponding to a distinct combination of specific messages and specific operators.

16. The vehicle of claim 14, wherein the acknowledgement from the vehicle operator is one of a manual input, a voice command, and a gesture command.

17. The vehicle of claim 16, wherein the acknowledgment from the operator is the manual input, and wherein the manual input is one of an analog button press and a screen tap.

18. The vehicle of claim 14, wherein the vehicle controller is configured to verify the acknowledgement originates from the vehicle operator using the gaze tracking system.

\* \* \* \* \*